United States Patent [19]
Lapeyre

[11] 3,875,614
[45] Apr. 8, 1975

[54] METHOD AND APPARATUS FOR REMOVING SHELLS FROM CRUSTACEA

[75] Inventor: James Martial Lapeyre, New Orleans, La.

[73] Assignee: The Laitram Corporation, New Orleans, La.

[22] Filed: Jan. 11, 1973

[21] Appl. No.: 322,609

Related U.S. Application Data
[62] Division of Ser. No. 236,918, March 22, 1972, Pat. No. 3,745,609.

[52] U.S. Cl. .................................. 17/48; 17/73
[51] Int. Cl. .................................. A22c 29/00
[58] Field of Search .......................... 17/48, 73

[56] References Cited
UNITED STATES PATENTS

| | | | |
|---|---|---|---|
| 2,659,930 | 11/1953 | Jagger | 17/73 |
| 3,007,801 | 11/1961 | Lapeyre | 17/48 |
| 3,634,909 | 1/1972 | Matthiesen | 17/73 |

Primary Examiner—Louis G. Mancene
Assistant Examiner—Robert F. Cutting
Attorney, Agent, or Firm—Wilkinson, Mawhinney & Theibault

[57] ABSTRACT

The present disclosure is directed to a method and apparatus for removing shells from crustacea in which the crustacea is compelled to travel a predetermined path while being subjected to an incising action to open the shells and while moving at an increasing rate of speed during the incising action at the conclusion of which the meats and shell fragments are separated by floatation.

3 Claims, 4 Drawing Figures

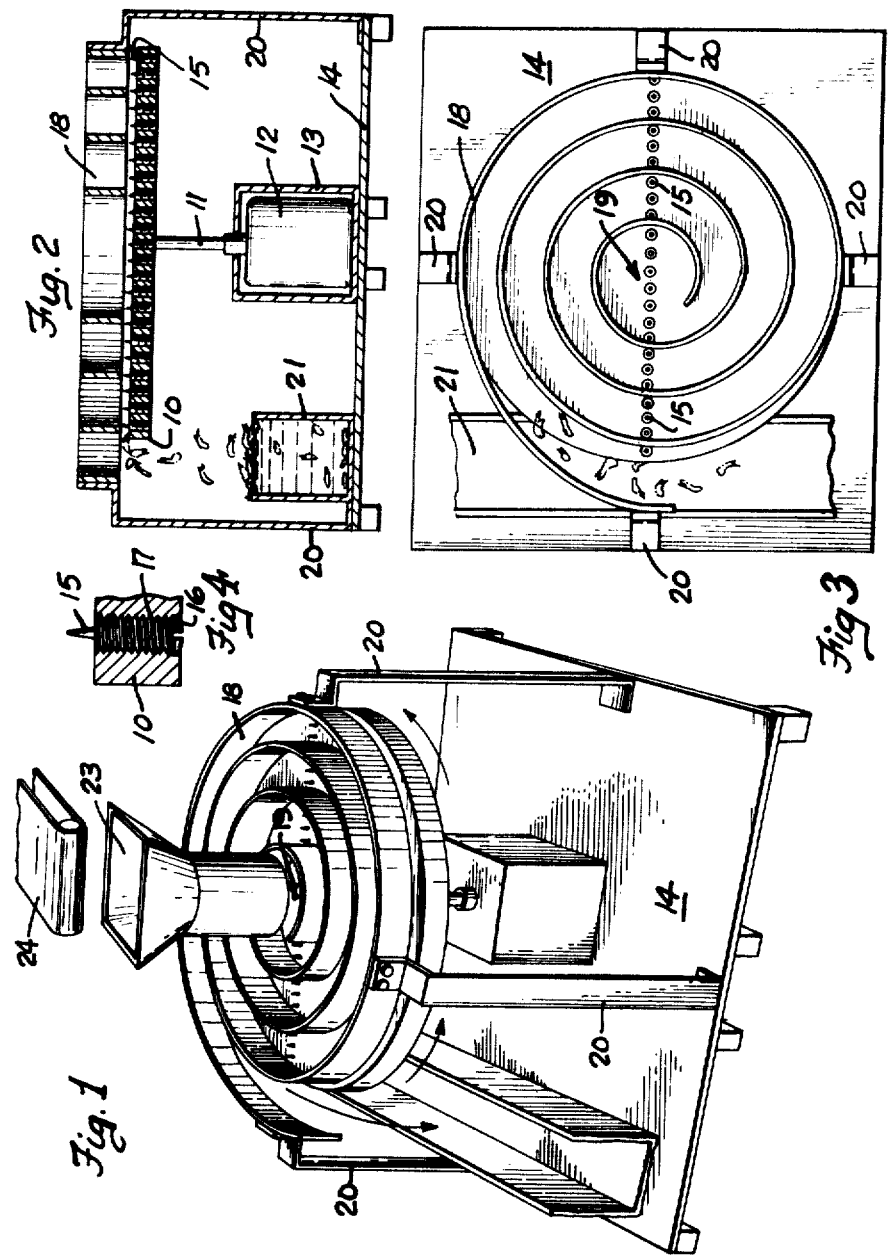

METHOD AND APPARATUS FOR REMOVING SHELLS FROM CRUSTACEA

This application is a division of Ser. No. 236,918, filed Mar. 22, 1972 now U.S. Pat. No. 3,745,609, for Method and Appratus For Removing Shells from Crustacea.

An object of the present invention is a method for removal of shells from crustacea meats such as shrimp, lobster, crawfish, crabs and the like during which the crustacea is caused to follow a predetermined path while being subjected to a multiplicity of incising projections of knife-like sharpness which cut through the shell at an increasing rate of speed to cut up the shell and by centrifugal motion tend to separate the shell from the meat and to introduce the meat and shells into a floatation bath for final separation where due to the difference in specifice gravities between the shells and crustacea meats the meats float and the shells sink permitting the meats to be skimmed off and recovered.

A further object of the present invention is to provide an apparatus in which a high speed rotating disc having upstanding incising projections has a volute guide positioned thereabove and the crustacea are introduced at substantially the center of the disc and the crustacea are caused to move toward the periphery of the disc at an ever increasing speed to cut the sheels from the meat and to thereafter effect separation by gravity floatation.

With the foregoing and other objects in view, the invention will be more fully described hereinafter, and will be more particularly pointed out in the claims appended hereto.

In the drawings, wherein like symbols refer to like or corresponding parts throughout the several views:

FIG. 1 is a perspective view of an apparatus constructed in accordance with the present invention.

FIG. 2 is a transverse section through the apparatus of FIG. 1.

FIG. 3 is a top plan view of the apparatus of FIG. 2.

FIG. 4 is a fragmentary sectional view taken at an enlarged scale through the rotary disc showing the removability of the incising means.

Referring now to the drawings 10 designates a moving surface in the form of a flat disc mounted on a shaft 11 driven by a motor 12 within a housing 13 mounted on a base 14. Upstanding above the upper surface of the disc 1 are incising elements 15 which may be needle points or small knife blades and as shown best in FIG. 4, these elements 15 are mounted in threaded bases 16 which mate with openings 17 in the disc 10 so that as they become worn or broken they may be replaced.

A volute guide 18 having its eye 19 over the center of rotation of the disc 10 is supported above an spaced from the disc 10 and incising elements 15 by support brackets 20.

A floatation separation trough 21 is positioned on the base 14 beneath the exit opening 22 of the volute guide 18 where the crustacea meats and shells will be discharged into a brine solution in which the meats will float and the shells will sink. The trough 21 may be either a tank or a trough having a circulating brine solution acting as a conveyor for the meats where they may be conveyed for packaging or further processing.

Positioned above the eye 19 of the valute guide 18 is a feed funnel 23 which receive shell on crustacea from an endless conveyor 24.

In operation the shell on crustacea are placed on the conveyor 24 which discharges them into the feed funnel 23 which drops them into the eye 19 of the volute guide, where, with motor 12 causing rotation of disc 10 the crustacea shells are subjected to the incising action of the elements 15 which initially nove slowly since the point of introduction is at the center of disc 10. The volute guide 18 causes the crustacea to be advanced toward the periphery of the disc 10 where the action of the incising elements increase to their maximum speed to cut through the crustacea shells.

As the shells and meats are discharged they fall into the brine solution in the trough or tank 21 where due to the difference in specific gravity between the shells and meats the meats will float and be drawn off from the shells.

What is claimed is:

1. The method of removing crustacea shells from the meat of crustacea comprising compelling a shell on crustacea to travel along a predetermined volute path, subjecting the shell to a multiplicity of incising actions during travel along said volute path, and separating the crustacea meats from the shell fragments by floatation upon completion of the crustacea having travelled the predetermined volute path.

2. The method of claim 1 wherein the speed of travel of said crustacea along the predetermined path is accelerated from start to finish.

3. The method of claim 1 wherein the predetermined path of travel of said crustacea is volute.

* * * * *